Oct. 10, 1961  J. R. FOSTER  3,003,544
TIRE BEAD BREAKING APPARATUS
Filed Oct. 29, 1958  3 Sheets-Sheet 1

INVENTOR.
JAMES R. FOSTER
BY Lowell & Henderson
ATTORNEYS.

Oct. 10, 1961     J. R. FOSTER     3,003,544
TIRE BEAD BREAKING APPARATUS

Filed Oct. 29, 1958     3 Sheets-Sheet 2

INVENTOR.
JAMES R. FOSTER
BY Lowell & Henderson
ATTORNEYS.

Oct. 10, 1961 — J. R. FOSTER — 3,003,544
TIRE BEAD BREAKING APPARATUS
Filed Oct. 29, 1958 — 3 Sheets-Sheet 3
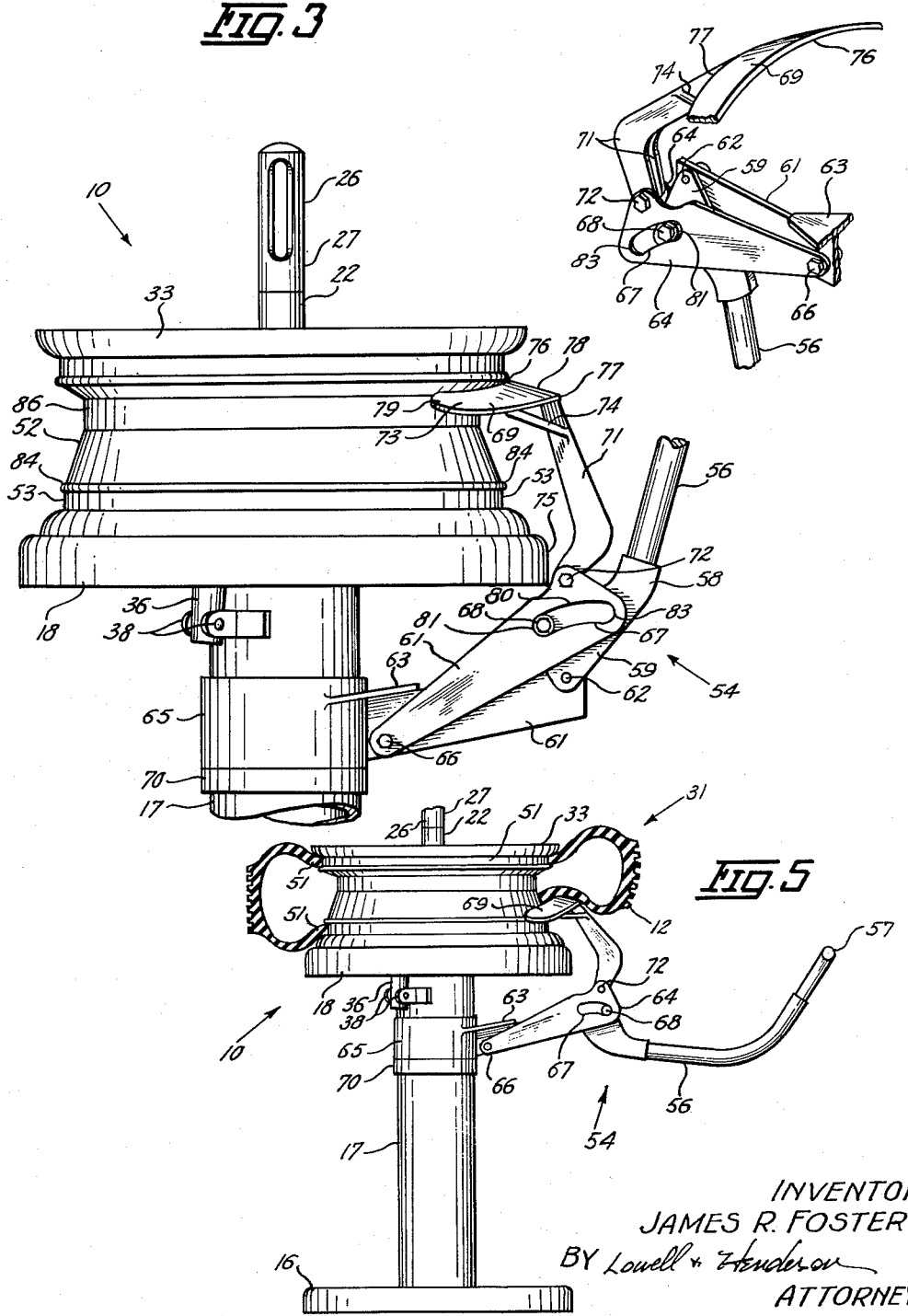
INVENTOR.
JAMES R. FOSTER
BY Lowell + Henderson
ATTORNEYS.

United States Patent Office 3,003,544
Patented Oct. 10, 1961

3,003,544
TIRE BEAD BREAKING APPARATUS
James R. Foster, Fort Dodge, Iowa, assignor to Coats Company, Fort Dodge, Iowa, a partnership of Iowa
Filed Oct. 29, 1958, Ser. No. 770,557
2 Claims. (Cl. 157—1.26)

This invention invention relates generally to tire dismounting apparatus and more particularly to a device for moving a bead of a pneumatic tire out of engagement with a complementary portion of the rim of a wheel for the tire.

An object of this invention, therefore, is to provide an improved device for moving the bead of a pneumatic tire out of engagement with a complementary portion of the rim of a wheel for the tire.

A further object of this invention is to provide a device for rolling the bead of a pneumatic tire out of engagement with a complementary portion of a wheel rim.

Another object of this invention is to provide a tire dismounting device which includes a pivotally mounted curved shoe member engageable with a tire at a position adjacent the tire bead for rolling a substantial peripheral portion of the tire bead out of engagement with a complementary rim portion of the wheel for the tire, so that the remainder of the bead is easily manually moved out of engagement with its complementary rim portion.

Yet another object of this invention is to provide a tire dismounting device with a novel lever and shoe assembly utilizing a cam action for minimizing the lifting effort required by the operator to operate the device.

A still further object of this invention is to provide a tire dismounting device which is simple in construction, economical to manufacture, and efficient in operation to quickly and easily roll a bead of a pneumatic tire out of engagement with a complementary portion of a wheel rim.

Further objects, features and advantages of this invention will become apparent from a consideration of the following description, when taken in conjunction with the accompanying drawing in which:

FIG. 3 is a side elevational view of the tire dismounting device of this invention, illustrated similarly to FIG. 1, and showing the position of the tire engaging shoe when it is in a final operating position with the tire having been removed from the wheel;

FIG. 4 is a fragmentary perspective view of a portion of the tire dismounting device of this invention, and showing particularly the assembly of the shoe and operating lever therefor; and FIG. 5 is a reduced side elevational view of the tire dismounting device of this invention, showing particularly the location of the shoe operating lever when the device is in the intermediate operating position.

Figure 1:
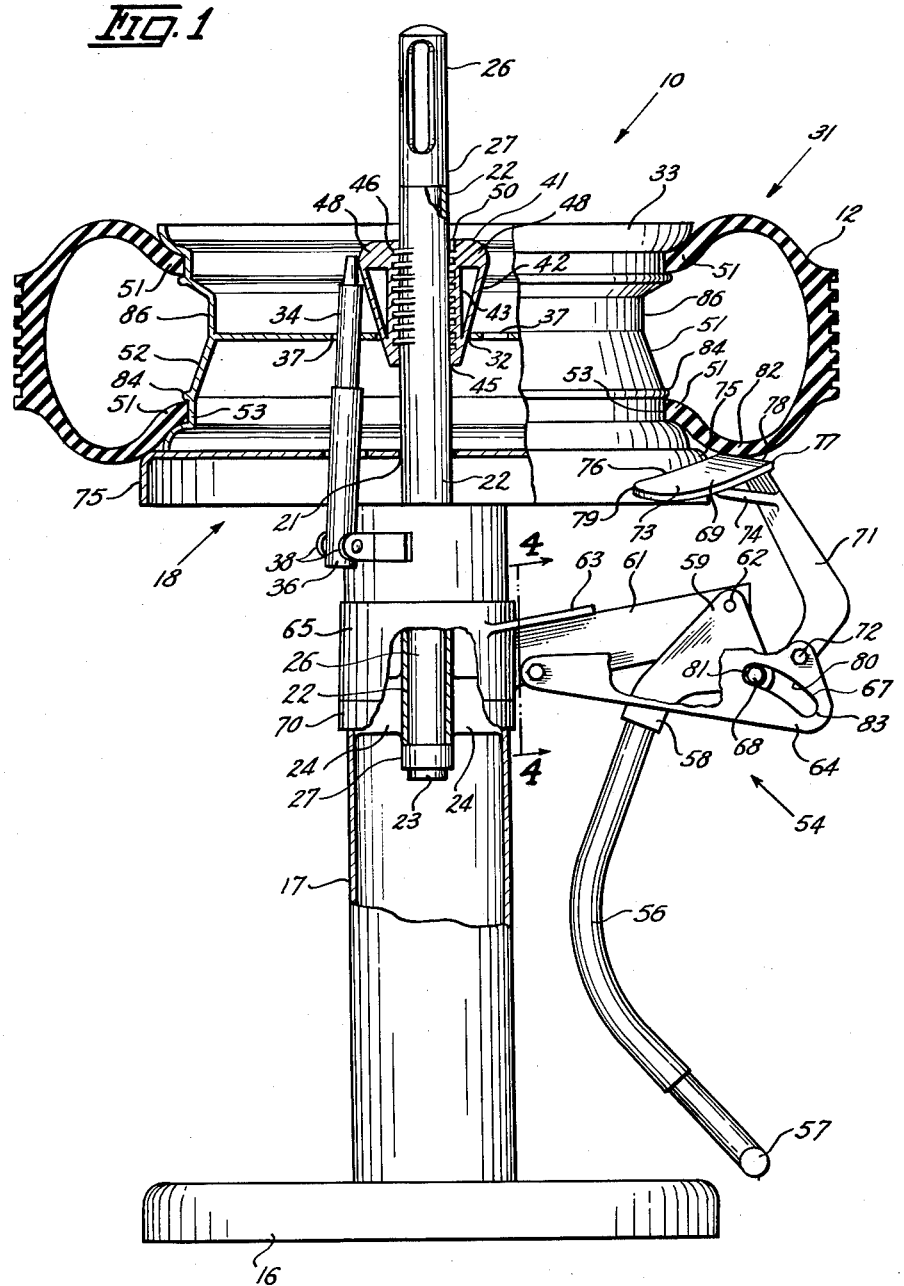
FIG. 1 is a side elevational view of the tire dismounting device of this invention, shown in assembly relation with a tire and wheel assembly, and showing the device in an inoperative, rest position, with some parts broken away and other parts shown in section for the purpose of clarity.

With reference to the drawings, the tire dismounting device of this invention, indicated generally at 10, is illustrated in FIG. 1 as including a flat circular base 16 adapted to be supported on a floor surface and having a central tubular standard 17 secured to and projected upwardly from a central position on the base 16.

Mounted on the upper end of the standard 17, in a concentric relation therewith, is a wheel supporting table unit 18. The table unit 18 is of a size to receive conventional vehicular wheels for fourteen, fifteen and sixteen inch tires.

Coaxially arranged in a spaced relation within the standard 17 and projected upwardly therefrom through a central opening 21 (FIG. 1) in the table unit 18, is a tubular bearing 22, the lower end 23 of which terminates at a position substantially midway between the opposite ends of the standard 17 (FIG. 1). The bearing 22 is supported within the standard 17 by the provision of wing or brace members 24 secured to and extended between the bearing 22 and the inner wall of the tubular standard 17. Rotatably supported within and extended through the bearing 22 is an elongated shaft 26. Collars 27 fixed on the ends of the shaft 26 are engageable with adjacent ends of the bearing 22 to maintain the shaft against axial movement relative to the bearing.

It is seen, therefore, that the bearing 22 and the shaft 26 form an integral part of and constitute an upward extension of the standard 17, and also a center post for the table unit 18.

In mounting a tire and wheel rim assembly 31 (FIG. 1), consisting of a tire 12 of the tubeless type mounted on a wheel 33, on the device 10, the assembly 31 is arranged in a flat, horizontally supported position on the table unit 18, with the bearing or center post 22 extended upwardly through a central opening 32 in the wheel 33. With the wheel and tire assembly 31 in this horizontal position, the extensible outer portion 34 (FIG. 1) of a dowel unit 36, pivotally secured to ears 38 carried on the standard 17 at a position below the table unit 18, is extended through one of the bolt receiving apertures 37 in the wheel 33 to hold the wheel against rotation on the table unit 18. As best appears in FIG. 1, in this supported position of the assembly 31, the center post, namely the bearing 22 and the bar 26, project above the assembly 31.

The wheel 33 is centered relative to the center post 22 and in turn relative to the table unit 18 by the provision of a wheel clamping unit 41 (FIG. 1) which includes a cone shape member 42 having a tubular hub 43 for coaction with a threaded rack 46 secured to and extended axially of the bearing 22 at a position above the table unit 18. The bore 45 of the hub 43 is tapped to receive the threaded rack 46, and has a groove 50 extended longitudinally thereof over its full length which is of a width slightly greater than that of a threaded rack 46.

In use, the clamping unit 41, with the rack 46 received within the groove 50, is moved downwardly on the bearing 22 to an engaged position with the side wall of the center opening 32 in the wheel 33. On rotation of the clamping unit 41, by means of a pair of wing portions 48 formed on the upper end of the cone member 42, the hub 43 is advanced downwardly on the rack 46 to tightly clamp the wheel 33 against the table unit 18. Since the cone member 42 is initially in engagement with the wheel 33, a turn of the unit 41 of less than one revolution is sufficient to accomplish the necessary clamping action.

Removably mounted on the device 10 for moving the tire bead 51 inwardly of the wheel rim 52 and out of engagement with the complementary rim or flange portion 53, or in other words for breaking the tire bead 51, is a lever and shoe assembly, indicated generally at 54 (FIGS. 1, 2 and 3) and in detail in FIG. 4.

The assembly 54 includes a handle 56 of a curved configuration, as best shown in FIGS. 1 and 5, having a horizontally disposed hand grip 57 at the lower or outer end thereof and a bifurcated portion 58 at its upper or inner end consisting of a pair of parallel spaced triangular-like plate 59 (FIG. 4).

The plates 59 are pivotally supported on opposite sides of an arm 61 (FIG. 1) extended radially outwardly of the standard 17 at a position below the table unit 18 by a pivot pin 62 inserted through the plates 59 and the member 61 whereby the handle 56 is pivotally supported on the outer end of the arm 61 for up and down pivotal movement. The inner end of the arm or support member 61 is welded to a ring or bearing member 65 rotatably carried on the standard 17 and maintained against downward axial movement by a stop ring 70. A triangular brace 63 is welded between the bearing member 65 and the top of the member 61.

A pair of parallel lift arms 64 of an irregular, elongated shape (FIG. 4) are arranged in a spaced relation, one to the outside of each plate member 59, and have their inner ends pivotally connected at 66 to the member 61 adjacent the standard 17 for up and down movement. At their outer ends, the lift arms 64 are formed with transversely opposite arcuate slots 67, which extend generally longitudinally of the lift arms 64 and generally normal to their direction of movement. A roller device 68, mounted on the plates 59, has the opposite ends thereof received for a cam-like reciprocal movement within the slots 67.

The assembly 54 further includes a curved shoe 69 (FIGS. 1 and 4) carried on the upper ends of a pair of parallel supporting shanks 71 the lower ends of which are connected by a pivot 72 to the outer ends of the lift arms 64 above the slots 67. The shoe 69 is elongated, and has its end portions 73 braced by rods 74 connected to the shanks 71, and is of a curvature which corresponds substantially to the curvature of the depending peripheral flange 75 of the table 18. When in the inoperative or rest position of FIG. 1, the upper surface 73 of the shoe 69 is inclined downwardly from the forward or leading edge 76 of the shoe (FIG. 1) toward the rear edge 77, and with the end portions 73 of the shoe being sloped downwardly relative to the center portion 78. As a result of the curvature of the shoe 69, in the FIG. 1 position thereof, substantially the entire forward edge 76 of the shoe is against the table flange 75, with only the extreme end tips 79 being spaced slightly outwardly of the flange 75.

When the lever and shoe assembly 54 is resting in the inoperative position as best shown in FIG. 1, the pivot 62 between the arm member 61 and the plate members 59 is spaced radially outwardly and upwardly, relative to the standard 17, from the lift arm pivots 66. The roller device 68 is also spaced radially outwardly of the pivots 66 but is substantially on a horizontal level therewith, being below and slightly outwardly of the pivot 62.

In the operation of the device 10 to move the lower tire bead 51 out of engagement with the corresponding rim portion 53, assume the device 10 to be in the inoperative or rest position shown in FIG. 1 with the tire and wheel assembly 31 mounted on the table unit 18 as also illustrated in FIG. 1 against rotational, vertical and transverse movements. With the handle 56 in a depending position extended downwardly from the handle pivot 62, the roller device 68 is located at the inner ends 81 of the slots 67, as viewed in FIG. 1, and with the shoe 69 resting against the table flange 75, with its upper surface below the tire side wall 82 at a position spaced outwardly of the tire bead 51. Of note, since the shank 71 of the shoe 69 is pivotally connected at 72 to the lift arms 64, the shoe is freely movable relative to the pivot 72. However, in the position of FIG. 1, the center of gravity of the shoe 69 is to the left of the pivot 72, so that the shoe rests naturally against the table flange 75.

To move the handle 56 from its rest position of FIG. 1 toward the intermediate position of FIG. 5, the handle 56 (FIG. 2) is swung in a counterclockwise direction by a lifting effort of the operator. As the handle 56 moves upwardly about its pivot 62, its motion is transmitted by the roller device 68, also moving in a counterclockwise direction, to the lift arms 64. This motion transmission is accomplished by the roller device 68 moving upwardly against the upper walls 80 of the slots 67 and, due to the ensuing counterclockwise movement of the lift arms 64, also moving away from the slot ends 81, the action being comparable to a cam and a cam follower arrangement. As a result of the upward pivotal movement of the lift arms 64, the pivot pin 72 carried thereby also moves counterclockwise or upwardly and inwardly relative to the standard 17.

During the initial upward swinging movement of the handle 56, therefore, the shoe supporting shanks 71 are moved upwardly such that the shoe member 69 carried thereby is forced against the side wall 82 of the tire 12. Advantageously, due to the slight droop of the end portions 73, only the central portion 78 of the shoe 69 initially engages the tire side wall 82 so as to minimize the manual effort required by the operator at the beginning of the bead breaking operation.

Figure 2:
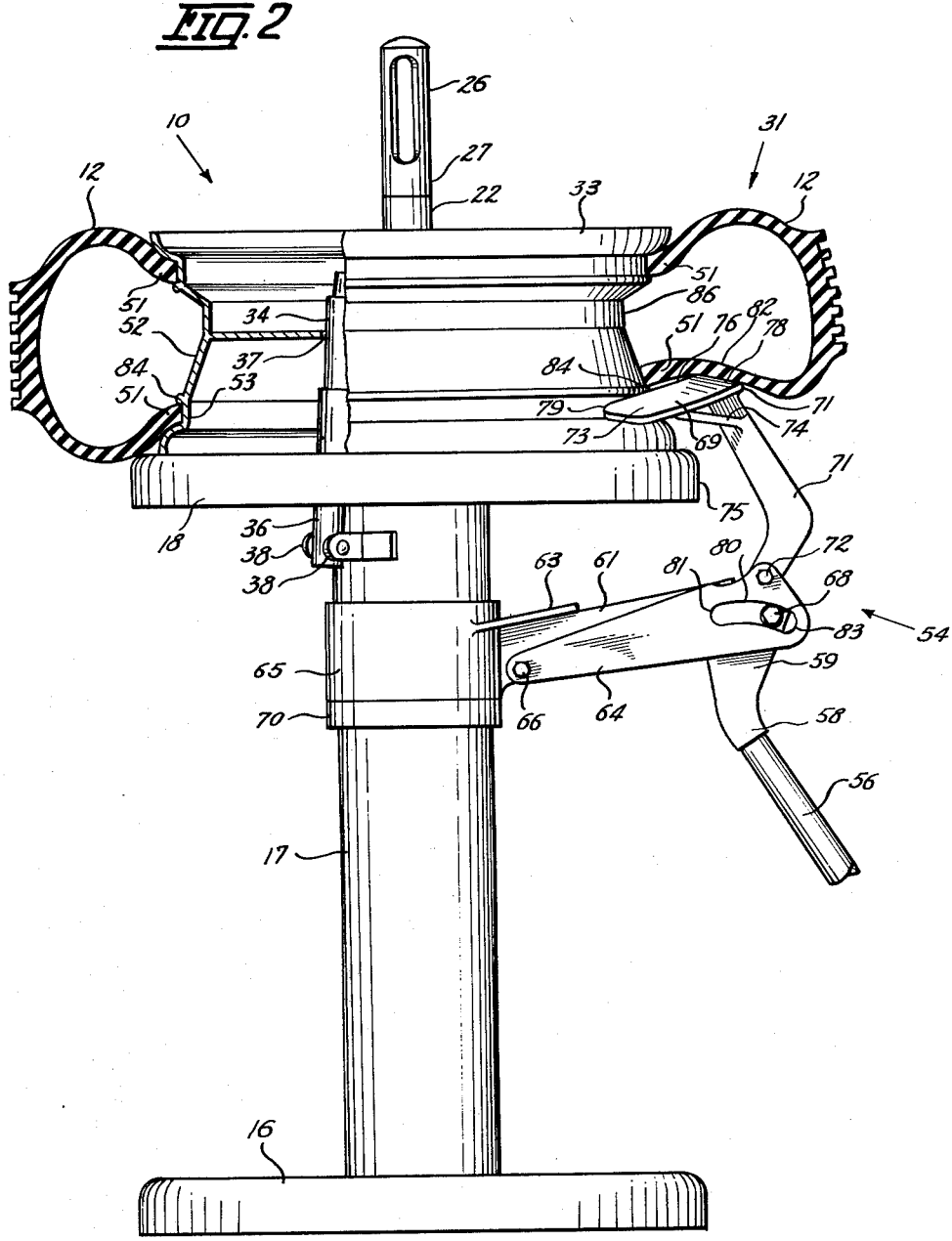
FIG. 2 is a side elevational view of the tire dismounting device of this invention, illustrated similarly to FIG. 1, and showing the tire engaging shoe member for the device moved upwardly from the inoperative, rest position of FIG. 1.

On continued upward swinging movement of the handle 56 from its operative position in FIG. 2 to the intermediate position of FIG. 5, the roller device 68 continues to move away from the slot ends 81 and into the slot ends 83, at which point the lift asembly 54 is at the intermediate position of operation in FIG. 5. Concurrently with this action, the entire front edge 76 of the shoe 69 contacts and exerts a force against the tire side wall 80 whereby the bead 51 is moved away and broken from the wheel rim portion 53 along with being rolled over and inwardly of the rim projection 84.

In the intermediate position of the handle 56 and of the shoe 69 (FIG. 5), the shoe pivot 72 has been moved above the handle pivot 62 and the roller device 68 at the slot ends 83 is positioned outwardly of and substantially above the pivot 62. Thus the shoe 69 has been moved upwardly and inwardly from its rest position in FIG. 1. Additionally, the grip 57 of the handle 56, by virtue of the handle configuration, is located so that the operator may now apply a push on the hand grip 57, as opposed to a further lifting or pulling effort.

On further movement of the handle 56 from the intermediate position of FIG. 5 to the final position of FIG. 3, such continued counterclockwise movement of the handle 56 is transmitted to the lift arms 64 by the roller device 68 moving upwardly against the upper wall 80 of the slots 67 and away from the slot ends 83 to the inner slot ends 81, so that at the end of the handle movement (FIG. 3), the roller device 68 has made a complete cycle of reciprocal movement within the slots 67.

By virtue of this further upward and inward movement of the roller device 68 and the transmission of a like movement to the lift arms 64 and the shoe supporting shanks 71, the shoe 69 continues to move the tire bead 51 upwardly on the wheel rim 51 until in the final position of the lift assembly 54 in FIG. 3, the bead 51 (not shown in FIG. 3) is moved completely into the drop center 86. Of note, during the entire operation, the shoe 69 in rolling the bead away from the rim 53 and into the drop center 86 does so without contacting the bead 51.

The arcuate extent of the tire bead 51 thus broken away from the rim 53 is generally sufficient so that by this operation, the balance of the tire bead is readily movable by hand out of engagement with its corresponding rim portion 53. Should, however, an unusually difficult bead removal operation be encountered so that the remainder of the tire bead 51 is not readily manually removable, the handle 56 is returned to its inoperative position illustrated in FIG. 1. The entire lever and shoe assembly 54 is then rotated, by means of the bearing member 65, about the standard 17 until the shoe 69 is beneath a section of a remaining unbroken portion of the bead 51. The above described operation is then repeated to thereby move the entire bead 51 out of engagement with the corresponding rim portion 53.

From the above description, it is seen that this invention provides a tire dismounting device 10 which is readily operable to roll the lower bead 51 for a tubeless tire 12 out of engagement with the complementary portion 53 of a rim 52 for the tire and into the drop center thereof. By virtue of the improved lever and shoe assembly 54 and the motion transmitting cam action, the hand grip 57 is moved through an angle of substantially one hundred and eighty degrees whereby the bead breaking action is consummated by a pushing effort on the part of the machine operator. Obviously, the device 10 is equally adapted to the usual pneumatic tires having tubes.

Although the invention has been described with respect to a preferred embodiment thereof, it is to be understood it is not to be so limited, since changes can be made therein which are within the full intended scope of this invention as defined by the appended claims.

I claim:

1. Tire dismounting apparatus comprising an upright standard, a table mounted on said standard for horizontally supporting a tire and wheel assembly, the tire of said assembly having a bead engageable with a complementary rim portion of said wheel, supporting means mounted on said standard and including a supporting arm carried on and extended radially outwardly therefrom, lift means including a pair of parallel arm members and pivotally mounted at their inner ends to said supporting means, arranged on opposite sides of said supporting arm for up and down movement, said arm members having outer portions extended beyond the outer end of said supporting arm and formed wtih transversely opposite slots, a shoe member having a curvature corresponding to that of said rim portion and adapted to engage the lower side wall of said tire, shank means depending from said shoe member and pivotally connected to the outer portion of said arm members, and handle means for raising and lowering said arm members, said handle means extending between said arm members and having one end pivotally connected to said supporting arm outer end, said handle means including further a roller device parallel to and spaced from the pivot by which the handle is connected to said support arm and having opposite ends thereof positioned in said slots for engagement with said arm members, whereby on pivotal movement of said handle means in one direction, said shoe member is moved into engagement with the lower side wall of said tire to provide for the movement of said tire bead out of engagement with the complementary rim portion of said wheel.

2. Tire dismounting apparatus comprising an upright standard, a table mounted on said standard for horizontally supporting a tire and wheel assembly, the tire of said assembly having a bead engageable with a complementary rim portion of said wheel, supporting means mounted on said standard below said table and including a supporting arm mounted on and extended radially outwardly therefrom, a handle member pivotally supported on said arm for movement in a vertical plane, a lift element pivotally mounted to said supporting means for movement in a plane common with said handle member, said lift element having an elongated slot formed therein extended substantially normal to the direction of movement of said handle member, a device secured to said handle member in spaced relation to the pivotal support thereof and inserted horizontally through said slot for reciprocal movement therein in contacting relation with said lift element, and a shoe unit pivotally connected to said lift arm and adapted to engage the underside of said tire, whereby upward movement of said handle member is transmitted through said lift element to said shoe unit for moving the underside of said tire so as to break the bead away from said rim portion.

References Cited in the file of this patent

UNITED STATES PATENTS

| | | |
|---|---|---|
| 1,435,131 | Jacobson | Nov. 7, 1922 |
| 1,556,220 | Hill | Oct. 6, 1925 |
| 2,362,707 | Malmquist | Nov. 14, 1944 |
| 2,825,395 | Twiford | Mar. 4, 1958 |
| 2,842,191 | Coats | July 8, 1958 |